H. A. GOLLOBIN & N. A. BORNSTEIN.
REMOVABLE BRIDGE FOR TEETH.
APPLICATION FILED APR. 22, 1911.
1,008,028.
Patented Nov. 7, 1911.
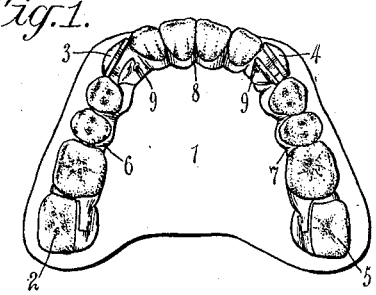
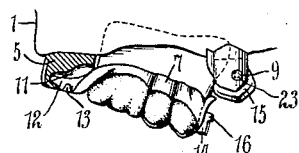
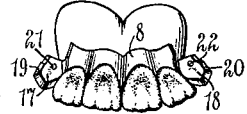
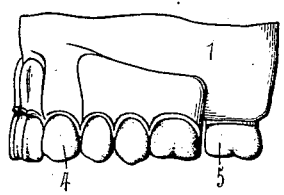
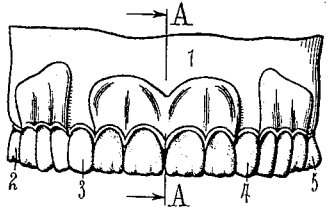
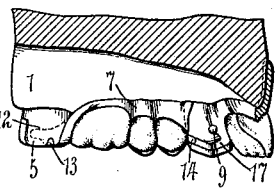
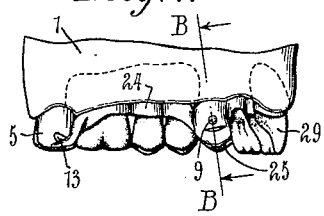
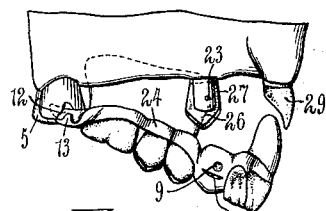
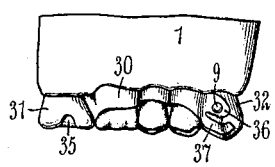
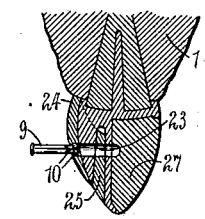
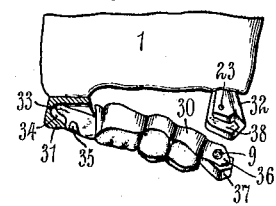
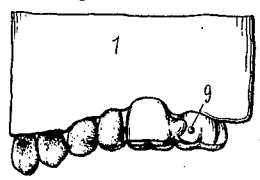
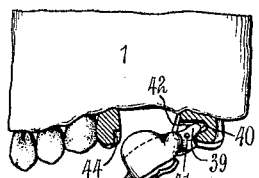
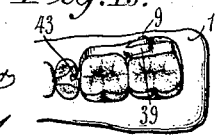
Witnesses:
Harry J. Fleischer
George Barry
Inventors:
Harry A. Gollobin
Newton A. Bornstein
by their attorneys
COLUMBIA PLANOGRAPH CO., WASHINGTON, D. C.

UNITED STATES PATENT OFFICE.

HARRY A. GOLLOBIN AND NEWTON A. BORNSTEIN, OF NEWARK, NEW JERSEY, ASSIGNORS TO THE DENTAL DENTURE IMPROVEMENT COMPANY, OF NEWARK, NEW JERSEY, A CORPORATION OF NEW JERSEY.

REMOVABLE BRIDGE FOR TEETH.

1,008,028.  Specification of Letters Patent.  Patented Nov. 7, 1911.

Application filed April 22, 1911. Serial No. 622,735.

*To all whom it may concern:*

Be it known that we, HARRY A. GOLLOBIN, a subject of the Russian Empire, and NEWTON A. BORNSTEIN, a citizen of the United States, and residents of Newark, in the county of Essex and State of New Jersey, have invented a new and useful Improvement in Removable Bridges for Teeth, of which the following is a specification.

This invention relates to certain improvements in bridges for teeth, and has more particularly for its object to provide a removable bridge which is held positively in position; which may be removed very easily for purposes of cleaning or repair; which is very rigid when locked in its position; and which is absolutely prevented from being pulled away from its position unintentionally and which will not drop or rise from its position.

This invention is particularly directed to the means for removably securing the bridge in position within the mouth.

Practical embodiments of the invention are represented in the accompanying drawings, in which, Figure 1 is an inverted plan of the roof of a mouth with three bridges in position therein, four abutments being shown for securing said bridges in the mouth, Fig. 2 is a front view of the same, Fig. 3 is a side view, Fig. 4 is a section taken in the plane of the line A—A of Fig. 2, looking in the direction of the arrows, Fig. 5 is a detail section showing one of the side bridges partially removed from between its abutments, Fig. 6 is a detail back view of the front bridge removed from the mouth, Fig. 7 is a back view of a modified form of bridge locked in position within the mouth, Fig. 8 is a detail section taken in the plane of the line B—B of Fig. 7, looking in the direction of the arrows, Fig. 9 is a view similar to Fig. 7, with the bridge partially removed, Fig. 10 is an inverted plan view of another form of bridge in position within the mouth, Fig. 11 is an inside view of the same, Fig. 12 is an inside view partially in section, showing the bridge partially removed from between its abutments, Fig. 13 is a view similar to Fig. 8, with the parts in the position which they assume when the pin has been withdrawn from its locking position, Fig. 14 is a back view of still another modified form of bridge locked in position within the mouth, Fig. 15 is an inverted plan view of the same, Fig. 16 is a view similar to Fig. 14, with the bridge released, the two abutments being shown in section, and Fig. 17 is an enlarged detail view of one of the split locking pins.

In the form shown in Figs. 1 to 6 inclusive, the portion of the mouth represented in the drawings is denoted by 1 and the teeth which form the abutments for the bridges are denoted by 2, 3, 4 and 5. The two side bridges are denoted by 6 and 7 and the front bridge by 8. The side bridge 6 with its teeth is interposed between the teeth 2 and 3 which form permanent abutments; the side bridge 7 with its teeth is interposed between the teeth 4 and 5 which also form permanent abutments, and the front bridge 8 with its teeth is interposed between the teeth 3 and 4. The side bridges 6 and 7 have interlocking hinge connections with the abutment teeth 2 and 5, as will hereinafter more fully appear, and said bridges have their free ends arranged to be removably secured to the abutment teeth 3 and 4 by the front bridge 8 and split locking pins 9.

Each of the split locking pins 9 is enlarged at the free end of its bridges, as shown at 10, for preventing the pin from being removed from either the abutment or the bridge, as the case may be, when it is withdrawn from its locking engagement, thus obviating the liability of loosening the pin and also obviating the difficulty of inserting the pin into its hole when it has been entirely removed.

Each of the abutment teeth 2 and 5 is provided with an undercut recess 11 into which projects a lug 12 at the inner end of each of the bridges 6 and 7. Adjacent to this lug 12 each side bridge 6 and 7 is provided with a laterally arranged lug 13 which is fitted to bear upon its abutment tooth and draw the lug 12 snugly against the outer wall of its recess to prevent any lost motion of the interlocking hinge connection of the bridge with its abutment tooth. Each of the side bridges 6 and 7 is provided at its free end with a tongue 14 arranged to enter an open-ended recess 15 in its particular abutment tooth 3 or 4, said tongue 14 being provided with a projection 16. The front bridge 8 is provided at its ends with tongues 17, 18, arranged to enter the said recesses 15 in the abutment teeth 3, 4, said tongues being provided with projections 19, 20, arranged to overlap the projections 16 on the tongues 14 at the free ends of the side bridges 6 and 7. These tongues 17, 18, are provided with holes 21, 22, therethrough which are fitted to register with holes 23 in the abutment teeth 3 and 4 for permitting the insertion of the split locking pins 9. The interlocking hinge ends of the side bridges 6 and 7, the tongues at the free ends thereof and the tongues on the front bridge 8 are all located at angles to their respective bridges so that when the bridges are secured in position, they hold the abutment teeth against being drawn together or spread apart, thus also anchoring the bridges rigidly within the mouth. It will be seen that in the arrangement of bridges as hereinabove described, the locking pins 9 serve not only to lock the front bridge to its abutment teeth but also serve to lock the free ends of the side bridges to the said abutment teeth, the inner ends of said side bridges being interlocked with their abutment teeth. To remove the bridges for cleaning or repair, it will be simply necessary to withdraw the split locking pins 9, a sufficient distance to permit the front bridge to be removed. This will permit the side bridges being removed by a swinging movement as clearly indicated in Fig. 5.

As an instance of a bridge removably secured to an abutment tooth at a distance from the interlocking hinge connection of the bridge with another abutment tooth, a form such as that shown in Figs. 7, 8, 9 and 13 may be used, wherein the bridge 24 is provided with an intermediate tongue 25 arranged to enter a recess 26 in the abutment tooth 27. In this instance the split locking pin 9 passes through holes in the inner wall of the bridge, the outer and inner walls of the tooth abutment 27 and the tongue 25 of the bridge. In this form the bridge 24 is extended beyond the tongue 25 sufficiently to carry two additional teeth between the abutment tooth 27 and the next abutment tooth 29. In this form the locking pin 9 is held against removal from the inner wall of the bridge when the pin is in its withdrawn position.

Another form of bridge embodying the invention is represented in Figs. 10, 11 and 12, in which only one side bridge 30 is shown as interposed between two abutment teeth 31, 32. The bridge 30 is provided at its inner end with a longitudinal lug 33 similar to the lug 12 described with reference to Figs. 1 to 6 inclusive, which lug 33 enters a recess 34 in the abutment tooth 31. This lug 33 is crowded against the outer wall of the recess 34 by the lateral lug 35. The tongue 36, 37 at the free end of the bridge 30 is split, the portion 37 of which is fitted to enter a recess 38 in the abutment tooth 32. In this form the split locking pin is arranged to pass through holes in the tongue 36, 37 and in the inner wall of the abutment tooth 32 for removably locking the side bridge in position in the mouth.

Still another form of bridge embodying the invention is represented in Figs. 14, 15, 16, in which the bridge is locked to the same abutment tooth to which it is hinged. In this case the bridge is provided with a longitudinal lug 39 arranged to enter the recess 40 and the split pin 9 is arranged to engage the holes 41, 42, in the bridge and abutment tooth respectively for removably locking the bridge in position. The free end of the bridge is provided with a tongue 43 arranged to enter a recess 44 in the abutment tooth adjoining the free end of the bridge.

It is to be understood that the forms herein shown for illustrating the improved means for removably locking bridges in position within the mouth are only a few of the very many different forms in connection with which the invention might be used.

What we claim is:

1. A bridge removably hinged to an abutment and a laterally movable pin for locking and releasing the bridge.

2. A removable bridge having an interlocking hinge connection with an abutment at one end and a tongue and recess engagement with another abutment for retaining the bridge against lateral movement in the mouth and a laterally movable pin for locking the bridge to and releasing it from said last named abutment.

3. A removable bridge provided at one end with a longitudinal lug arranged to enter a recess in a fixed abutment and a lateral lug arranged to bear on said abutment for cramping the longitudinal lug against the outer wall of said recess, said bridge being further provided at its other end with a tongue arranged to enter a recess in a second fixed abutment.

4. A removable bridge provided at one end with a longitudinal lug arranged to enter a recess in a fixed abutment and a lateral lug arranged to bear on said abutment for cramping the longitudinal lug against the outer wall of said recess, said bridge being further provided at its other end with a tongue arranged to enter a recess in a second fixed abutment, and a laterally movable pin passing through said tongue and recess for removably securing said tongue in said recess.

5. A hinge connection for bridges comprising a longitudinal lug arranged to enter a recess in a fixed abutment and a lateral lug arranged to bear on said fixed abutment for drawing the first named lug snugly against the outer wall of said recess.

In testimony, that we claim the foregoing as our invention, we have signed our names in presence of two witnesses, this seventh day of April 1911.

HARRY A. GOLLOBIN.
NEWTON A. BORNSTEIN.

Witnesses:
F. GEORGE BARRY,
HENRY C. THIEME.

---

Copies of this patent may be obtained for five cents each, by addressing the "Commissioner of Patents, Washington, D. C."